United States Patent [19]
Detwiler

[11] Patent Number: 6,045,046
[45] Date of Patent: Apr. 4, 2000

[54] FULL COVERAGE BARCODE SCANNER

[75] Inventor: Paul O. Detwiler, Lawrenceville, Ga.

[73] Assignee: NCR Corporation, Dayton, Ohio

[21] Appl. No.: 09/141,197

[22] Filed: Aug. 27, 1998

[51] Int. Cl.[7] .................................................. G06K 7/10
[52] U.S. Cl. .......................................... 235/467; 235/383
[58] Field of Search ..................................... 235/467, 383

[56] References Cited

U.S. PATENT DOCUMENTS

| | | | |
|---|---|---|---|
| 5,206,491 | 4/1993 | Katoh et al. | 235/467 |
| 5,229,588 | 7/1993 | Detwiler et al. | 235/467 |
| 5,459,308 | 10/1995 | Detwiler et al. | 235/467 |
| 5,475,207 | 12/1995 | Bobba et al. | 235/467 |
| 5,557,093 | 9/1996 | Knowles et al. | 235/462 |
| 5,684,289 | 11/1997 | Detwiler et al. | 235/467 |
| 5,689,102 | 11/1997 | Schonenberg et al. | 235/467 |

*Primary Examiner*—Harold I. Pitts
*Attorney, Agent, or Firm*—Francis L. Conte

[57] ABSTRACT

A barcode scanner includes a laser for emitting a laser beam toward a rotary spinner. The spinner includes a plurality of mirror facets for reflecting the beam in turn therefrom towards a plurality of pattern mirrors. The mirrors in turn reflect the beam to form corresponding scan lines emitted through a window having a width along a first axis of the scanner, and a height along a second axis of the scanner perpendicular thereto. The pattern mirrors are collectively positioned around the spinner to effect a pattern of scan lines on the window extending substantially completely across the height thereof for correspondingly providing full height coverage scanning of a barcode traversing the window along the first axis.

21 Claims, 4 Drawing Sheets

FULL COVERAGE BARCODE SCANNER

BACKGROUND OF THE INVENTION

The present invention relates generally to barcode scanners, and, more specifically, to a pass-by vertical barcode scanner.

Barcode scanners are commonly found in retail establishments such as supermarkets which require relatively high speed scanning effectiveness in view of the large number of products which are typically being purchased. In this application, either horizontal or vertical, or both, barcode scanners may be used for increasing the likelihood and speed of scanning a barcode swiped thereacross.

A typical barcode is printed on a label and includes a series of alternating dark bars and white spaces therebetween of varying width in a one-dimensional array in accordance with the Universal Product Code (UPC) for example. The series of bars are vertically straight and stacked horizontally parallel to each other in the form of a picket fence, and are therefore typically referred to as a picket barcode.

In order to read the barcode, the scanner produces one or more scan lines which must traverse the bars and spaces of the barcode in sequence for correspondingly absorbing and reflecting light therefrom. The reflected light is therefore modulated by the barcode and follows a reverse path into the scanner and is detected by a photodetector and decoded in an electrical processor for determining the information encoded in the barcode, typically used for identifying the attached product and its price.

In this way, a barcode may be quickly read and decoded provided, however, that one or more scan lines properly traverse the barcode. Since the barcode is attached at different locations on different products and may be presented to the scanner in different orientations, a scan line may not properly traverse the barcode resulting in a reading failure.

For this reason, various types of barcode scanners have been developed including handheld and stationary vertical or horizontal scanners or the combination thereof for improving the likelihood of properly reading and decoding a barcode presented in any orientation. The different types of scanners enjoy different benefits, with associated disadvantages including complexity, size, and cost.

The typical stationary scanner is relatively complex, large, and expensive since it includes a rotating spinner having mirror facets which reflect a laser beam along an arcuate path over several pattern mirrors to produce a pattern of differently directed scan lines through a window over which the barcode may be swiped. The scan line pattern is controlled by relative orientation of the individual pattern mirrors and the spinner facets, and is repeated once per revolution of the spinner.

Each spinner facet is typically disposed at a different inclination angle so generally parallel sets of scan lines may be produced from a common set of pattern mirrors cooperating with the spinner. The proper selection and orientation of spinner facets and pattern mirrors is critical for effecting a corresponding scan pattern for reading presented barcodes. However, many comprises are typically made in configuring the scanner in view of the complexity thereof, and therefore different scanners have different capabilities and disadvantages.

For example, scanners are typically limited in their ability to read the various orientations of the barcode as may be presented thereto. The basic one-dimensional barcode is a picket barcode as described above. As such, it requires a single scan line to horizontally traverse in sequence each of the vertical bars thereon in order to obtain a complete scan thereof. However, if the picket barcode is rotated 90° from its horizontal orientation to a vertical orientation it then becomes the commonly known ladder barcode with the bars extending horizontally and being stacked vertically. In this orientation, a horizontal scan line cannot read the barcode, but a vertically directed scan line is required for vertically traversing in turn the bars for reading the barcode.

The barcode may also have inclined orientations between the picket and ladder orientations including, for example, diagonal orientations 45° counterclockwise from the vertical or 45° clockwise from the vertical. These diagonal barcodes require different scan lines in order to properly traverse the inclined bars over the full length of the barcode to perfect a scan.

Since the complexity of the scanner increases as the number of scan lines increases and their orientation in space differs, there is a practical limit requiring compromise in each type of barcode scanner. Different scanners have different capability for reading the four basic barcode orientations, and the scanner design is rendered even more complex depending upon the intended direction of barcode swiping. Since a typical barcode is swiped in a horizontal plane, the scan patterns are specifically configured to maximize the likelihood of an effective scan thereof. Correspondingly, they lack effective scanning capability for a vertical swipe.

Yet further, since the scan pattern is locally produced inside the scanner and projected outwardly therefrom through a window it typically increases in area and has a limited effective scanning range. The scan pattern is typically small with closely spaced together scan lines at the plane of the window, and increases in area and spacing between the scan lines as the distance from the window increases.

Accordingly, it is desired to provide an improved vertical barcode scanner for pass-by operation which is relatively compact in size yet provides full coverage scanning of barcodes in multiple orientations.

BRIEF SUMMARY OF THE INVENTION

A barcode scanner includes a laser for emitting a laser beam toward a rotary spinner. The spinner includes a plurality of mirror facets for reflecting the beam in turn therefrom towards a plurality of pattern mirrors. The mirrors in turn reflect the beam to form corresponding scan lines emitted through a window having a width along a first axis of the scanner, and a height along a second axis of the scanner perpendicular thereto. The pattern mirrors are collectively positioned around the spinner to effect a pattern of scan lines on the window extending substantially completely across the height thereof for correspondingly providing full height coverage scanning of a barcode traversing the window along the first axis.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
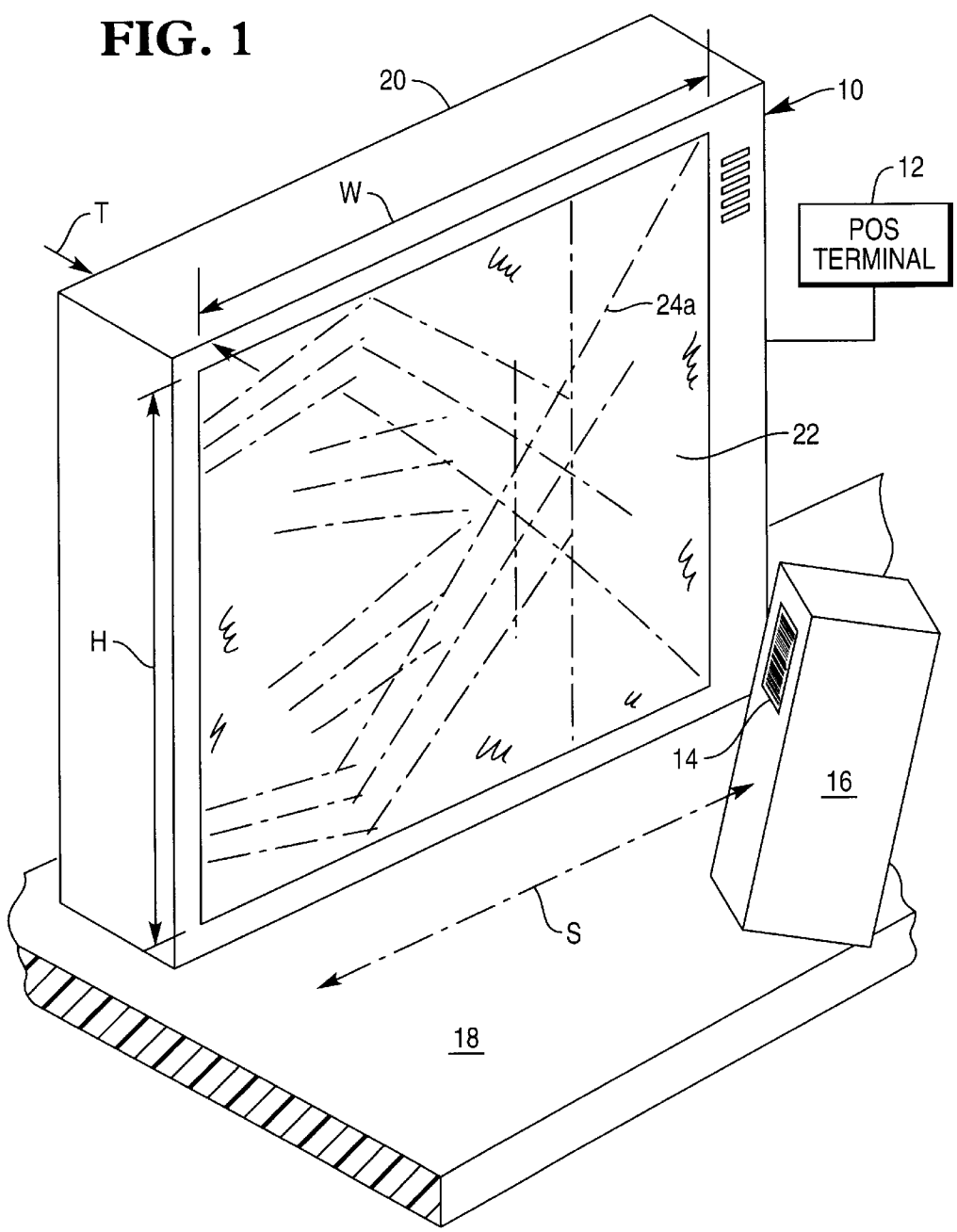
FIG. 1 is an elevational, isometric view of a vertical barcode scanner in accordance with an exemplary embodiment of the present invention.

Illustrated in FIG. 1 is a barcode scanner 10 in accordance with an exemplary embodiment of the present invention cooperating with a point of sale (POS) terminal 12 for use in an exemplary retail establishment. The terminal 12 itself may take any conventional form including an electronic cash register operatively joined to the scanner 10 for scanning a barcode 14 printed on a label secured to a product or merchandise 16 for example. The barcode 14 may take any conventional form such as a one-dimensional barcode having a series of alternating dark bars and white spaces of varying width in accordance with the UPC format for example.

The scanner 10 is preferably mounted in a vertical orientation atop a horizontal counter 18 so that the product and attached barcode 14 may be presented thereto in a pass-by operation in which the barcode 14 is traversed or swiped in a horizontal direction as indicated by the direction arrow S.

The scanner 10 includes a housing 20 in which its various components are suitably mounted, and has a vertically oriented transparent window 22 in front of which the barcode 14 may be swiped for the reading and decoding thereof.

Figure 2:
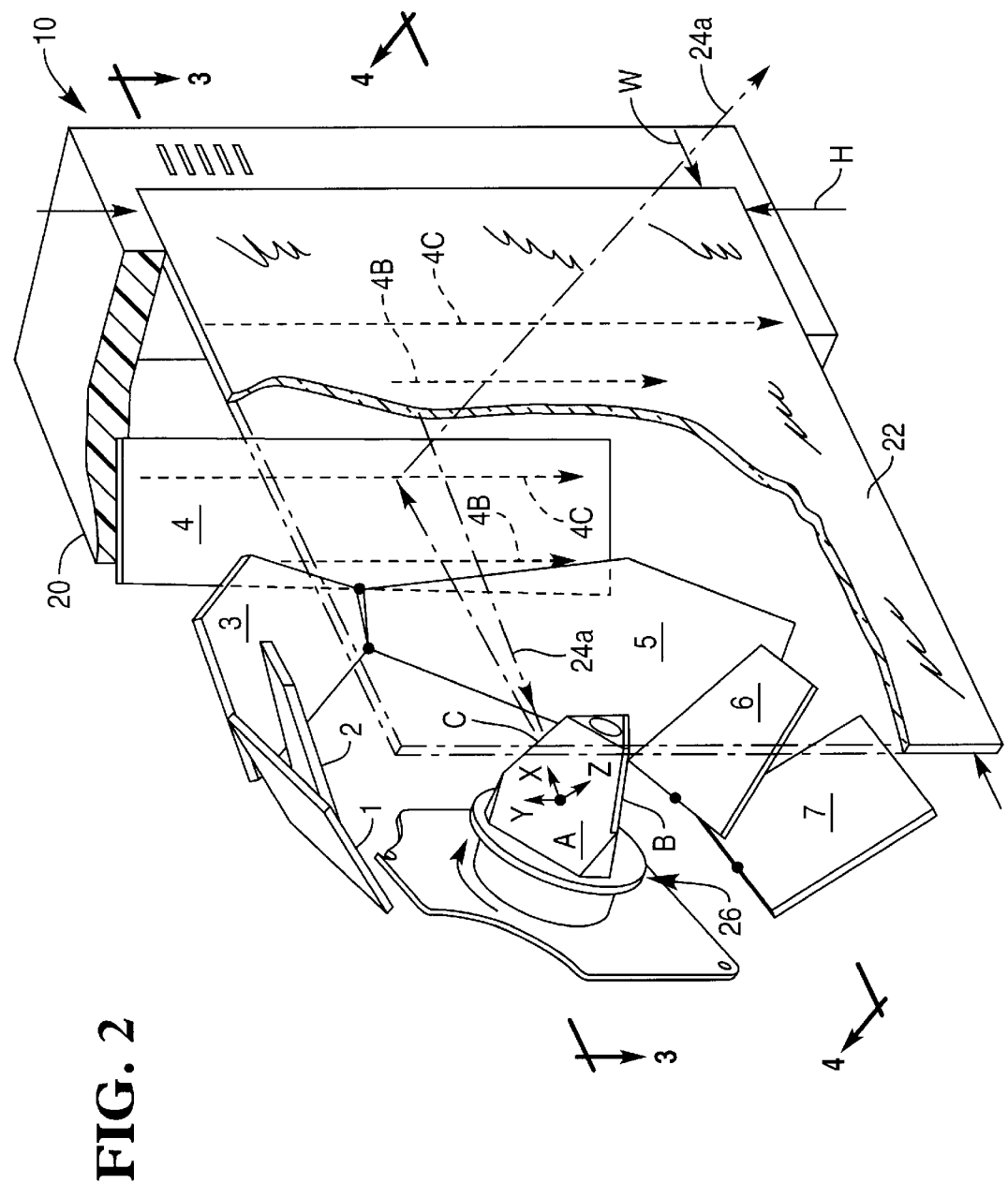
FIG. 2 is an isometric, cutaway view of the scanner illustrated in FIG. 1 including a rotary spinner cooperating with a plurality of pattern mirrors for producing a scan line pattern through a window thereof.
Figure 3:
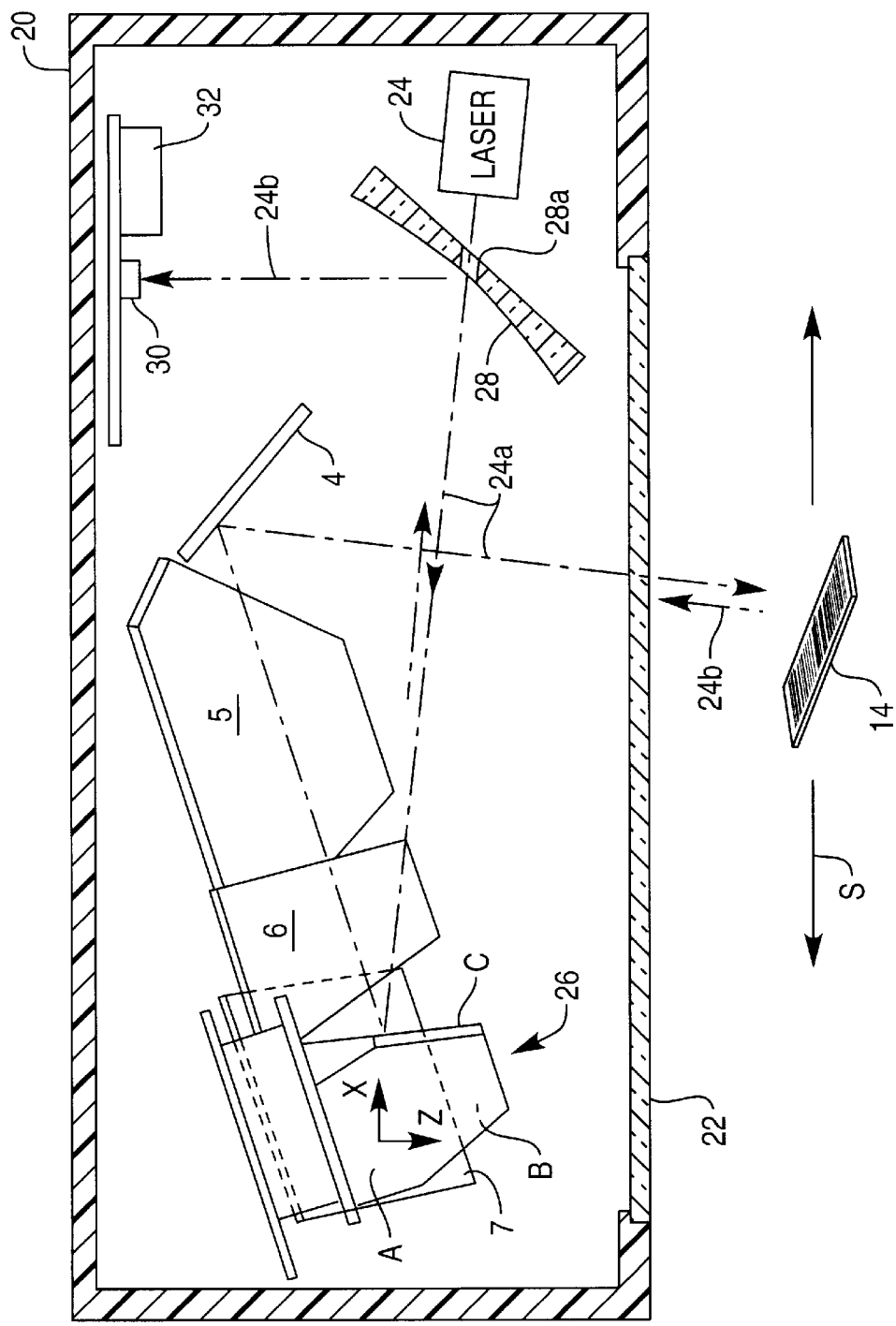
FIG. 3 is a top, sectional view for a portion of the scanner illustrated in FIG. 2 and taken along line 3—3.

The scanner is illustrated in cutaway view in FIG. 2 and in section view in FIG. 3. As shown initially in FIG. 3, the scanner includes a laser 24, which may be in the form of a laser diode for example, for emitting an outbound scanning laser beam 24a which is directed toward a rotary spinner 26.

As shown in FIG. 2, the spinner 26 includes an internal motor effective for rotating the spinner in the exemplary clockwise direction illustrated. The spinner 26 includes a plurality of mirror facets A,B,C optically aligned with the laser for reflecting the beam in turn therefrom as the spinner rotates.

The individual spinner facets are preferably oriented at different inclination angles for reflecting the laser beam 24a in correspondingly different paths. For example, there are three spinner facets A,B,C which reflect corresponding portions of the beam 24a in different directions for each revolution of the spinner 26.

Figure 4:
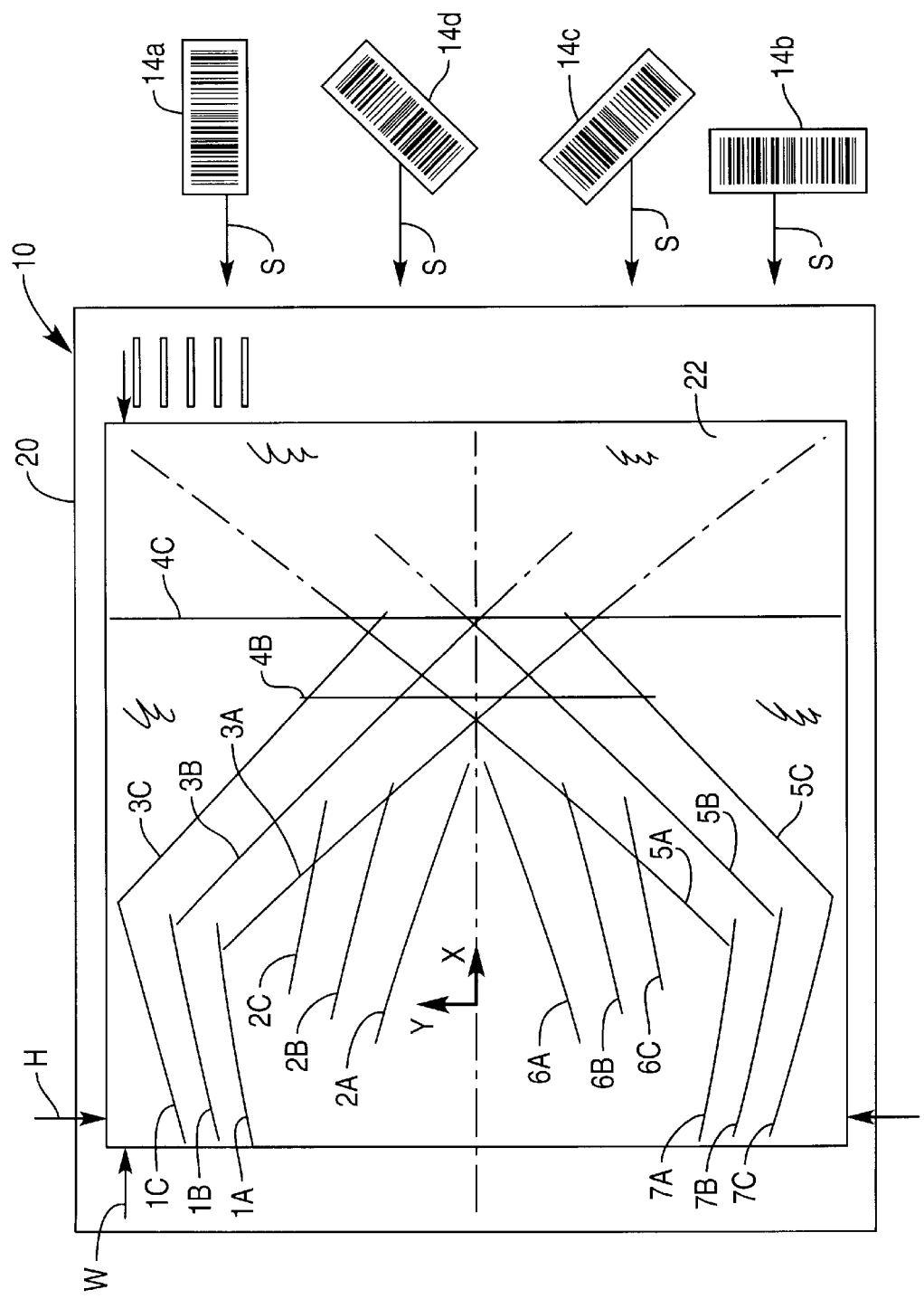
FIG. 4 is an elevational front view of the scanner illustrated in FIG. 2 and taken along line 4—4 for illustrating a scan line pattern in the plane of the window in accordance with an exemplary embodiment of the present invention.

A plurality of pattern mirrors 1–7 are optically aligned with the spinner 26 substantially symmetrically about a first or horizontal axis X for reflecting in turn the beam 24a to form corresponding symmetric scan lines shown in detail in FIG. 4. The pattern mirrors are designated by the numerals 1 through 7 in the order in which the laser beam 24a traverses the mirrors upon reflection from the spinner facets A,B,C. The individual scan lines are therefore identified by the combination of the specific pattern mirror and the specific spinner facet which trace the scan lines from the first scan line 1A to the last scan line 7C for each revolution of the spinner 26. Accordingly, the scan line pattern illustrated in FIG. 4 is collectively formed by firstly reflecting the laser beam 24a off each of the spinner facets A,B,C in turn and secondly reflecting the beam from the pattern mirrors 1–7 corresponding with each facet as described in more detail hereinbelow.

As shown in FIG. 2, the spinner 26 is centrally disposed at the extreme left end of the housing 20, and the pattern mirrors 1–7 circumferentially surround the spinner in part over about 180°. The window 22 is rectangular and is disposed adjacent the mirrors, and also covers the spinner for transmitting the scan lines formed by the laser beam 24a outwardly from the window and across the barcode 14, as also shown in FIGS. 1 and 3. The window 22 has width W along the first axis X, and a height H along a second axis Y perpendicular thereto. A global coordinate system has its origin at the center of the spinner 26 as illustrated in FIG. 2, with the first axis X pointing to the right along a horizontal center plane of the scanner, and the second axis Y pointing vertically upwardly, with a third orthogonal axis Z pointing out the window 22 and normal thereto.

The pattern mirrors 1–7 are collectively positioned around the spinner 26 to produce or effect a substantially symmetrical pattern of the scan lines on or at the window 22 extending substantially completely across the width and height thereof for correspondingly providing full vertical height scanning coverage of the barcode 14 traversing the window along the horizontal axis X and over the vertical axis Y.

The window illustrated in FIGS. 2 and 4 is preferably disposed vertically, with the first axis X and window width W extending horizontally, and the second axis Y and window height H extending vertically upwardly for effecting a pass-by scanner. In this way, the barcode 14 may be swiped in a horizontal plane in the swiping direction S in front of the window 22 for pass-by scanning at any vertical position along the full height of the window. Full scan pattern coverage over the entire vertical and horizontal extent of the window 22 is effected in a substantially large window, yet with a relatively compact housing 20.

For example, the window 22 may be about six inches wide and about six inches high in a closely fitting housing 20, which has a depth or thickness T of about three inches. This is a relatively large window when compared with prior art windows, and has substantially full scan line pattern coverage thereof.

More specifically, as indicated above, the spinner facets A, B,C have different inclination angles to produce respective sets of generally parallel, spaced apart scan lines from the pattern mirrors 1–7. The mirrors are positioned in the housing so that at least one scan line set collectively covers the full window height H as shown most clearly in FIG. 4.

As shown in FIG. 4, the barcode has four general orientations including a picket barcode 14a in which the bars extend vertically and are spaced apart horizontally; a ladder barcode 14b in which the bars extend horizontally and are spaced apart vertically; a first diagonal barcode 14c in which the ladder barcode 14b is rotated counterclockwise 45° from the vertical; and an opposite second diagonal barcode 14d in which the ladder barcode 14b is rotated clockwise 45° from the vertical. Other orientations of the barcodes therebetween are also possible but these four barcode orientations cover the basic range between horizontal and vertical barcodes and left and right diagonals therebetween.

In view of these several different orientations of the barcode 14, at least one of the pattern mirrors 1–7 is positioned to produce a corresponding scan line set collectively covering the full window height to scan a corresponding one of the barcode orientations.

For example, as shown in FIG. 2, the pattern mirrors include a single ladder mirror 4 extending vertically in the housing 20 over substantially the full height of the window 22 which is optically aligned with the spinner 26 to effect a corresponding ladder scan line set 4B,C as shown in both FIGS. 2 and 4 which collectively cover the full window height to scan the ladder barcode 14b presented at any horizontal plane over the entire vertical height of the window. As shown in FIG. 4, the ladder scan line 4C extends the full height of the window 22 and will readily traverse the ladder barcode 14b swiped to the left thereacross. The additional ladder barcode 4B is relatively short as explained hereinbelow and provides a redundant ladder scan line for scanning ladder barcodes centrally presented along the window.

Referring again to FIG. 2, the pattern mirrors also include a single diagonal mirror 3 or 5 optically aligned with the spinner to effect a ladder scan line set 3A,B,C or 5A,B,C collectively covering the full window height to scan only a corresponding one of the left or right diagonal barcodes 14c,d.

And, the pattern mirrors also include a group of picket mirrors 1,2,6,7 optically aligned with the spinner to effect a picket scan line set 1,2,6,7-A,B,C collectively covering the full window height to scan the picket barcode 14a presented anywhere therealong.

The diagonal mirrors 3,5 illustrated in FIG. 2 are specifically positioned to produce the corresponding diagonal scan line sets 3A,B,C and 5A,B,C illustrated in FIG. 4. A single first or left diagonal mirror 3 is mounted in the upper half of the housing 20 for covering the left diagonal barcode 14c. And correspondingly, a single second or right diagonal mirror 5 is mounted in the lower half of the housing 20 for independently covering the right diagonal barcode 4d.

As shown in FIG. 4, the left diagonal scan lines 3A,B,C are inclined downwardly to the right over the window 22 and collectively cover its full height for traversing the left diagonal barcode 14c swiped at any vertical position over the window 22. The left diagonal scan lines are about 45° to the horizontal first axis X so that they traverse the bars and spaces of the left diagonal barcode 14c substantially perpendicular thereto for effecting a complete scan thereof.

Similarly, the right diagonal scan lines 5A,B,C are inclined upwardly to the right in the window 22 at about 45° to the horizontal axis X and substantially perpendicularly to the left diagonal scan lines 3A,B,C. In this way, the right diagonal scan lines are disposed substantially perpendicularly to the bars and spaces of the right diagonal barcode 14d as it is swiped across the window 22 for effecting a complete scan thereof.

In a preferred embodiment, the pattern mirrors include at least one mirror 3,5 overlapping another mirror 4 as shown in FIG. 2 to intercept the laser beam 24a directed thereto from at least one of the spinner facets to increase the length of the scan line from the one mirror with a corresponding reduction in scan lines from the other mirror. Since the ladder mirror 4 is effective for generating at least one full height scan line 4C for reading the ladder barcode 14b, redundant ladder scan lines may be eliminated or reduced for improving full height coverage of the diagonal scan lines.

More specifically, the two diagonal mirrors 3,5 are preferably disposed between the spinner 26 and the ladder mirror 4 and overlap the ladder mirror 4 in part to intercept the laser beam directed thereto from at least one of the facets A to increase length of a corresponding one of the diagonal scan lines at the expense of the ladder scan lines.

The two diagonal mirrors 3,5 are preferably disposed symmetrically about the horizontal axis X, and adjoin or abut each other threat forwardly of the ladder mirror 4. The diagonal mirrors 3,5 are generally mirror images of each other about the horizontal axis X and aligned with the spinner 26 for producing the two sets of diagonal scan lines 3A,B,C and 5A,B,C each set generally inclined 45° to the horizontal axis and generally perpendicularly to each other.

The right most ends of the diagonal mirrors 3,5 as illustrated in FIG. 2 are generally triangular in configuration and intercept the laser beam 24a from the first facet A which would otherwise traverse the left most portion of the ladder mirror 4. The intercepted laser beam from the first facet A provides a continuation in length of the corresponding diagonal scan lines 3A,5A which would otherwise produce a third ladder scan line 4A which is missing in the FIG. 4 scan pattern. The main scan lines illustrated in FIG. 4 are shown in solid line, with the extensions of the diagonal scan lines shown in phantom line for emphasis since the phantom line portions are obtained at the expense of intercepting portions of the ladder scan lines.

Additional ones of the diagonal scan lines 3B,5B are also increased in length by intercepting the laser beam 24a from the ladder mirror 4 which would otherwise have produced a taller ladder scan line 4B.

In view of the limited space within the housing 20 in which the pattern mirrors may be mounted, no one mirror can effectively produce full height or full width coverage over the entire window 22 for various barcode orientations. Cooperation of the several pattern mirrors with the multi-faceted spinner 26 must be developed to effect the desired full coverage scan pattern.

As shown in FIG. 4, the diagonal scan lines 3,5-A,B,C vertically overlap or over-extend each other over the entire height H of the window 22 due in large part to the additional length of the two scan lines 3A,5A intercepted from the missing ladder scan line 4A. In this way, complete full height coverage at the window 22 for both the ladder barcode 14B and the left and right diagonal barcodes 14c,d is obtained for scanning these barcodes at any vertical position along the window.

In the preferred embodiment illustrated in FIG. 2, the picket mirrors are arranged in two pairs 1,2 and 6,7 symmetrically about the horizontal axis X for collectively effecting the picket scan lines also covering the full window height. The first mirror 1 and the seventh mirror 7 are mirror images of each other on opposite upper and lower sides of the horizontal X axis, and similarly, the second mirror 2 and the sixth mirror 6 are mirror images of each other on opposite sides of the horizontal axis.

The respective sets of picket scan lines 1,2,6,7-A,B,C are illustrated in FIG. 4 and are arranged in four sets of three scan lines each for a total of twelve picket scan lines.

The four picket mirrors, 1,2,6,7 are preferably positioned to effect respective picket scan lines therefrom spaced substantially uniformly apart over the full window height for full vertical coverage scanning of the picket barcode 14a at substantially any vertical position over the window height. The picket scan lines extend primarily horizontally and are spaced apart vertically to increase the likelihood of traversing the bars and spaces of the picket barcode 14a in one swipe. Since the picket bars are oriented vertically, the picket scan lines are oriented primarily horizontally for traversing the entire length of the barcode in a single swipe.

In order to increase the effective vertical coverage of the picket scan lines, the two mirrors in each of the picket mirror pairs are preferably differently positioned to oppositely incline the picket scan lines therefrom toward and away from the horizontal axis X, respectively. For example, the picket mirrors 1 and 7 are positioned to incline the corresponding picket scan lines 1A,B,C and 7A,B,C vertically upwardly and downwardly, respectively, away from the horizontal axis X.

Correspondingly, the picket mirrors 2,6 are positioned to incline the corresponding picket scan lines 2A,B,C and 6A,B,C vertically downwardly and upwardly, respectively, toward the horizontal axis X. In this way, the vertical spacing between the picket scan lines in each of the four sets and between the four sets may be substantially uniform to maximize the effective vertical coverage of the picket scan lines collectively. This increases the likelihood of an effective scan of the picket barcode 14a at any vertical position along the full height of the window 22.

The location and orientation of the spinner and pattern mirrors may be defined in any conventional manner using, for example, coordinate positions and right-hand-positive rotations as found in Opticad 4.0 commercially available from the Opticad Corporation, Santa Fe, N.Mex. Component definition may be obtained from the global coordinate system XYZ having an origin at the center of the spinner 26 as described above. In an exemplary embodiment, a laser coordinate system is obtained by translating from the global system 5.01 inches in the X direction, and 0.40 inches in the Z direction. This parallel intermediate coordinate system is then rotated minus 96.5° about the Y axis to form a laser coordinate system. The laser beam 24a is emitted along the positive Z axis thereof.

A general mirror coordinate system, for the spinner and pattern mirrors, is obtained by rotating from the global system 17.5° about the Y axis. Position and orientation of the pattern mirrors 1–7 are obtained by reference to local coordinate systems having origins centered at the bottom edge of the respective mirrors as indicated by the black dots illustrated in FIG. 2, with the bottom edges being parallel to a local X axis. The pattern mirrors surface is initially normal to the pattern mirror coordinate system Z axis. Each mirror is then moved into position by the translations in inches and rotations in degrees in the following table, where the rotations are relative to the individual mirror local coordinate system.

| Mirror | X | Y | Z | X (°) | Y (°) |
| --- | --- | --- | --- | --- | --- |
| 1 | 0.125 | 1.950 | −0.875 | 5.00 | 43.75 |
| 2 | 0.950 | 1.775 | −0.750 | −12.50 | 57.50 |
| 3 | 3.200 | 0.000 | −0.700 | −47.50 | 51.25 |
| 4 | 3.500 | 0.000 | −0.300 | −90.00 | 57.50 |
| 5 | 3.200 | 0.000 | −0.700 | −132.5 | 51.25 |
| 6 | 0.950 | −1.775 | −0.750 | −167.5 | 57.50 |
| 7 | 0.125 | −1.950 | −0.875 | −185.0 | 43.75 |

The axis of rotation of the spinner 26 is coincident with the general mirror system Z axis. The distance from the spinner axis to the facet center is 0.317 inches for facets A,B, and C. The facets are tilted back toward the front surface of the spinner such that the spinner is a truncated three sided pyramid. The angles between the back of the spinner and the facets are 81°, 78°, and 75° for facets A,B, and C, respectively.

The scanner 10 described above has particular utility in providing full vertical scan coverage in a pass-by configuration. In a preferred method of scanning the barcode 14, the window 22, is mounted vertically, and the barcode 14 is swiped horizontally across the window generally along the horizontal first axis X for pass-by scanning the barcode.

The barcode 14 may be swiped across the window 22 in any one of the four barcode orientations including picket 14a, ladder 14b, left diagonal 14c, and right diagonal 14d, and any orientation therebetween. Any of these barcode orientations may be used at any vertical position in front of the window for effecting full window scanning coverage of the barcode 14. As indicated above the window 22 may be six inches wide and high, which is substantially larger than conventional vertical windows, and yet also has a full width and height scan line pattern thereacross unlike the relatively smaller scan line patterns found in conventional vertical scanners. The area of the scan line pattern emitted from the window 22 increases little outwardly therefrom and has an effective range up to about eight inches, for example. Since in common practice barcodes are swiped closely adjacent to scanner windows, the full coverage scan pattern over the large window 22 greatly increases the likelihood of successful one-pass scanning of individual barcodes irrespective of their orientation.

As shown in FIG. 3, the scanner also includes suitable means for collecting and decoding the reflected light, designated 24b, from the barcode upon traversing the scan line thereacross. The reflected light 24b follows the reverse path through the scanner toward the laser 24 from which the laser beam originated. However, a collection mirror 28 is optically aligned between the laser 24 and the spinner 26 and includes a central bypass hole 28a through which the outbound laser beam 24a may pass to the spinner 26 without obstruction. The inbound reflected light 24b will be collected and focused by the collection mirror 28 and reflected toward a conventional photodetector 30 which converts the modulated reflected light 24b into a corresponding electrical signal. The photodetector 30 is operatively joined to a suitable electrical processor or decoder 32 which decodes the reflected light 24b to determine the information encoded in the barcode.

As indicated above, all of the components of the scanner 10 may be arranged in a compact assembly inside a relatively small housing 20 only slightly larger in area than the window 22 with a relatively small depth or thickness T. The exemplary seven pattern mirrors 1–7 and three spinner facets A,B,C collectively produce twenty scan lines in horizontal symmetry about the first axis X over the full height and width of the window 22 for substantially improved full vertical scan coverage of differently oriented barcodes. The resulting scanner is relatively compact, has few components, and may be manufactured at reduced cost compare to more complex scanners.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A scanner for scanning a barcode comprising:
   a laser for emitting a laser beam;
   a rotary spinner having a plurality of mirror facets optically aligned with said laser for reflecting said beam in turn therefrom;
   a plurality of pattern mirrors optically aligned with said spinner substantially symmetrically about a first axis for reflecting in turn said beam to form corresponding scan lines;

a window disposed adjacent said mirrors for transmitting said scan lines across said barcode, and having a width along said first axis, and a height along a second axis perpendicular thereto; and said mirrors being collectively positioned around said spinner to effect a pattern of said scan lines on said window extending substantially completely across said height thereof for correspondingly providing full height coverage scanning of said barcode traversing said window along said first axis and over said second axis.

2. A scanner according to claim 1 wherein:

said spinner facets have different inclinations to produce respective sets of spaced apart scan lines from said pattern mirrors; and said mirrors are positioned so that at least one scan line set covers said window height.

3. A scanner according to claim 2 wherein:

said barcode has four orientations including picket, ladder, first diagonal, and an opposite second diagonal; and at least one of said pattern mirrors is positioned to produce a corresponding scan line set collectively covering said window height to scan a corresponding one of said barcode orientations.

4. A scanner according to claim 3 wherein said pattern mirrors include a single mirror optically aligned with said spinner to effect a ladder scan line set covering said window height to scan said ladder barcode.

5. A scanner according to claim 3 wherein said pattern mirrors include a single diagonal mirror optically aligned with said spinner to effect a diagonal scan line set covering said window height to scan only one of the said diagonal barcodes.

6. A scanner according to claim 3 wherein said pattern mirrors include a group of picket mirrors optically aligned with said spinner to effect a picket scan line set covering said window height to scan said picket barcode.

7. A scanner according to claim 3 wherein said pattern mirrors include:

a single ladder mirror optically aligned with said spinner to effect a ladder scan line set for covering said window height to scan said ladder barcode;

a single diagonal mirror optically aligned with said spinner to effect a diagonal scan line set covering said window height to scan only one of said diagonal barcodes; and a group of picket mirrors optically aligned with said spinner to effect a picket scan line set covering said window height to scan said picket barcode.

8. A scanner according to claim 7 wherein said pattern mirrors include a single first diagonal mirror for covering said first diagonal barcode and a single second diagonal mirror for covering said second diagonal barcode.

9. A scanner according to claim 8 wherein said diagonal mirrors are disposed between said spinner and said ladder mirror.

10. A scanner according to claim 9 wherein said diagonal mirrors overlap said ladder mirror to intercept said beam directed thereto from at least one of said facets to increase length of a corresponding one of said diagonal scan lines.

11. A scanner according to claim 10 wherein said diagonal mirrors are disposed symmetrically about said first axis, and adjoin each other threat forwardly of said ladder mirror.

12. A scanner according to claim 11 wherein said picket mirrors include two pairs of mirrors arranged symmetrically about said first axis for collectively effecting said picket scan lines covering said window height.

13. A scanner according to claim 7 wherein said picket mirrors include two pairs of mirrors arranged symmetrically about said first axis for collectively effecting said picket scan lines covering said window height.

14. A scanner according to claim 13 wherein said mirrors in each of said picket mirror pairs are differently positioned to oppositely incline said picket scan lines therefrom toward and away from said first axis, respectively.

15. A scanner according to claim 14 wherein said four picket mirrors are positioned to effect respective picket scan lines therefrom spaced substantially uniformly apart over said window height for full coverage scanning of said picket barcode at substantially any position over said window height.

16. A scanner according to claim 13 wherein said spinner facets number three.

17. A scanner according to claim 3 wherein said mirrors include at least one mirror overlapping another mirror to intercept said beam directed thereto from at least one of said facets to increase length of said scan line from said one mirror with a corresponding reduction in scan lines from said another mirror.

18. A scanner according to claim 3 wherein said window is disposed vertically, with said first axis and window width extending horizontally, and said second axis and window height extending upwardly for effecting a pass-by scanner.

19. A scanner according to claim 3 further comprising means for collecting and decoding light reflected from said barcode upon traversing said scan line thereacross.

20. A method of scanning a barcode using said scanner according to claim 3 comprising:

mounting said window vertically; and swiping said barcode horizontally across said window generally along said first axis for pass-by scanning said barcode.

21. A method according to claim 19 further comprising swiping said barcode across said window in any one of said four barcode orientations and at any vertical position in front of said window for effecting full window scanning coverage of said barcode.

* * * * *